United States Patent
Takeda et al.

(10) Patent No.: US 8,462,875 B2
(45) Date of Patent: Jun. 11, 2013

(54) TIMING REGENERATING DEVICE

(75) Inventors: Keishi Takeda, Tokyo (JP); Akinori Fujimura, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 995 days.

(21) Appl. No.: 12/505,687

(22) Filed: Jul. 20, 2009

(65) Prior Publication Data
US 2011/0013674 A1 Jan. 20, 2011

(51) Int. Cl.
H04L 27/00 (2006.01)
H04J 3/06 (2006.01)
H04B 15/00 (2006.01)

(52) U.S. Cl.
USPC .......................... 375/295; 370/350; 455/502

(58) Field of Classification Search
USPC .......................................... 375/295; 370/350
See application file for complete search history.

(56) References Cited

U.S. PATENT DOCUMENTS

| 5,297,162 | A | 3/1994 | Lee et al. | |
|---|---|---|---|---|
| 6,226,320 | B1 | 5/2001 | Häkkinen et al. | |
| 6,531,982 | B1* | 3/2003 | White et al. | 342/357.46 |
| 6,668,172 | B1* | 12/2003 | Yoshimura | 455/441 |
| 2002/0086720 | A1* | 7/2002 | Kim | 455/574 |
| 2002/0177458 | A1* | 11/2002 | Hokao | 455/502 |
| 2002/0181439 | A1* | 12/2002 | Orihashi et al. | 370/350 |
| 2003/0003947 | A1* | 1/2003 | Yasuda | 455/550 |
| 2003/0064708 | A1* | 4/2003 | Oota et al. | 455/412 |
| 2004/0062321 | A1* | 4/2004 | Nakamura et al. | 375/295 |
| 2004/0068483 | A1* | 4/2004 | Sakurai et al. | 707/1 |
| 2004/0071192 | A1* | 4/2004 | Nakamura et al. | 375/141 |
| 2005/0220175 | A1* | 10/2005 | Zhou | 375/141 |

FOREIGN PATENT DOCUMENTS

| CA | 2200599 | 2/1997 |
|---|---|---|
| JP | 5-327657 | 12/1993 |
| JP | 8-116293 A | 5/1996 |
| JP | 10-507333 A | 7/1998 |
| JP | 11-504777 A | 4/1999 |
| JP | 11-313005 A | 11/1999 |
| JP | 2001-186052 | 7/2001 |
| WO | WO 97/05717 A1 | 2/1997 |

OTHER PUBLICATIONS

Japanese Office Action Issued Jun. 12, 2012 in Patent Application No. 2008-046701 (with partial English translation).
Keishi Takeda et al., "A Study on Bit Rate Estimation Using Received Signal Power", Proceedings of the Society Conference of IEICE, 2007, 8 pages (with partial English translation).
Keishi Takeda et al., "A Study on Bit Rate Estimation Using Received Signal Power (2)", Proceeding of the Society Conference of IEICE, 2008, 8 pages (with partial English translation).

(Continued)

*Primary Examiner* — Leon-Viet Nguyen
*Assistant Examiner* — Sarah Hassan
(74) *Attorney, Agent, or Firm* — Oblon, Spivak, McClelland, Maier & Neustadt, L.L.P.

(57) ABSTRACT

A timing regenerating device regenerates a process timing for demodulating a reception signal in a spread spectrum communication system. The timing regenerating device includes a signal extracting unit that extracts a baseband signal from the reception signal on which an inverse spread processing is performed and a reference clock generating unit that converts the baseband signal into an electric power and generates a reference clock for a latch timing of the baseband signal output from the signal extracting unit based on the electric power.

4 Claims, 14 Drawing Sheets

OTHER PUBLICATIONS

Keishi Takeda et al., "A Study on Bit Rate Estimation using Received Signal Power", IEICE Technical Report, Jul. 2008, pp. 37-42 and cover pages (with English abstract).

P. Bricker, et al., "Integrated Receiver for NASA Tracking and Data Relay Satellite System", Military Communications Conference, MILCOM '90, 1990, pp. 0001-0005.

* cited by examiner

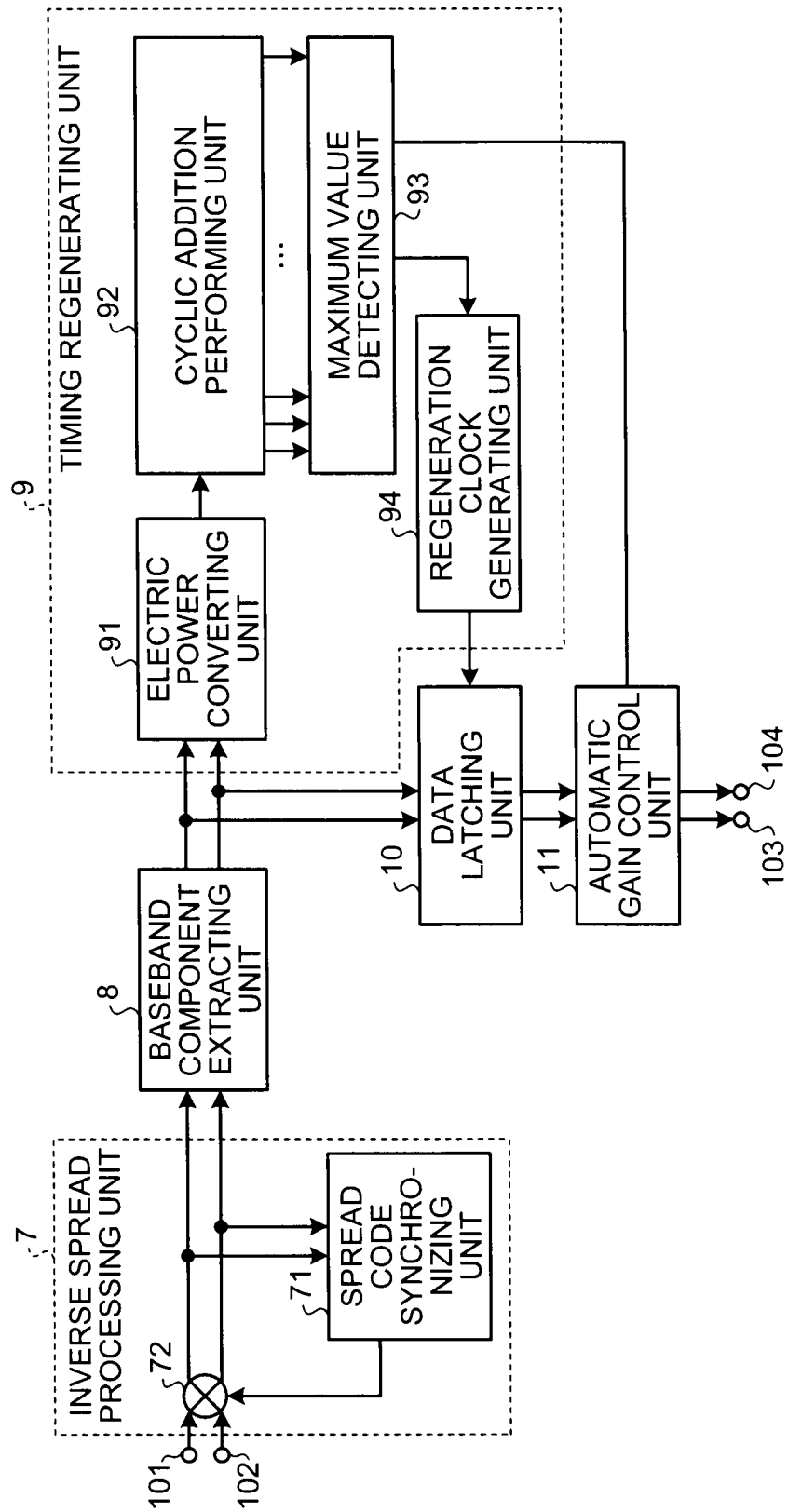

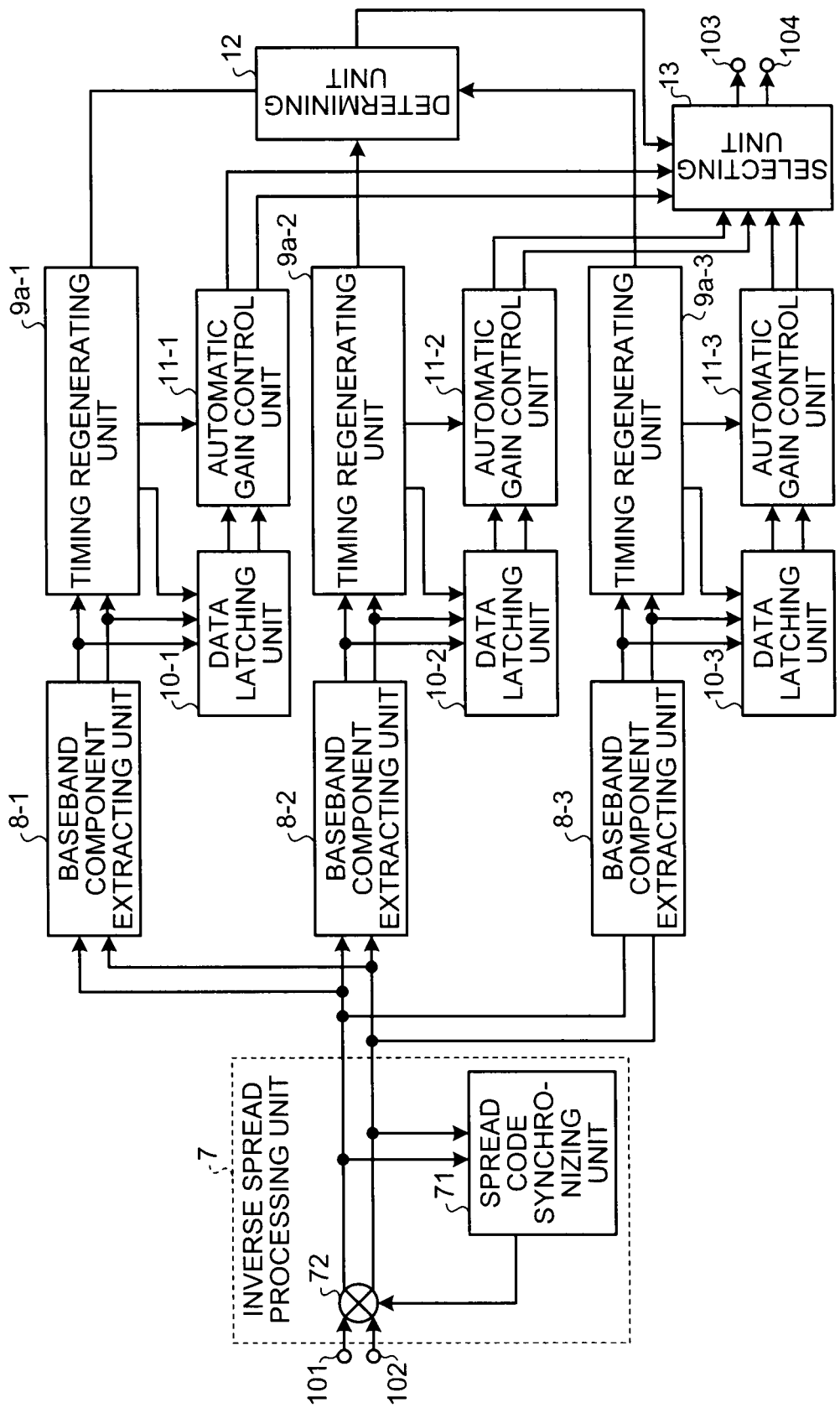

US 8,462,875 B2

TIMING REGENERATING DEVICE

BACKGROUND OF THE INVENTION

1. Field of the Invention

The present invention relates to a technology for regenerating a processing timing for performing a high-accuracy bit demodulation on a received signal after an inverse spread processing in a spread spectrum communication system.

2. Description of the Related Art

In a spread spectrum communication system, a communicating apparatus on the transmitting side (transmitting apparatus) performs spread spectrum processing by performing primary modulation on data to be transmitted and multiplying the primary-modulated data with a spread code. Subsequently, the transmitting apparatus converts the signal obtained by spread spectrum processing to a radio-frequency band and sends the radio-frequency band to a corresponding communication apparatus on the receiving side (receiving apparatus). Upon receiving a signal from the transmitting apparatus, the receiving apparatus performs inverse spread processing on the received signal. For that, the receiving apparatus synchronizes a spread code, identical to the spread code used for multiplication at the transmitting apparatus, to an intended timing and multiplies the received signal with that spread code. Moreover, the receiving apparatus integrates the signal energy of the inversely-spread signal in spread code periods and performs bit determination based on the addition of integration results.

A data decoding circuit disclosed by Japanese Patent Application Laid-open No. H05-327657 is an example of a conventional technology applicable to a receiving apparatus in a spread spectrum communication system. The data decoding circuit identifies spread code periods by using cross-correlation values, performs accurate bit determination by obtaining correlation values of bit data in periods identical to the spread code periods, and demodulates a received signal.

However, the data decoding circuit is configured with a synchronous system in mind in which bit data cycles (bit periods of data) and spread code periods are in a relation of integral multiples (including the case of being identical). In other words, the data decoding circuit is not configured for an asynchronous system in which bit data cycles and spread code periods are not in a relation of integral multiples.

Thus, if the data decoding circuit is implemented for an asynchronous system in which bit data changes in mid-course of spread code periods, the amount of energy obtained by integrating the signal energy of the received signal and adding the integration results is sometimes less than the ideal amount of energy thereby causing decline in the bit determination accuracy.

To use the conventional data decoding circuit in a spread spectrum communication system while curbing decline in the bit determination accuracy, the system design needs to make sure that bit data cycles and spread code periods are in a relation of integral multiples. However, in such a system design, it is not possible to freely set the bit data cycles (bit rate).

SUMMARY OF THE INVENTION

It is an object of the present invention to at least partially solve the problems in the conventional technology.

According to one aspect of the present invention, there is provided a timing regenerating device that regenerates a process timing for demodulating a reception signal in a spread spectrum communication system. The timing regenerating device includes a signal extracting unit that extracts a baseband signal from the reception signal on which an inverse spread processing is performed; and a reference clock generating unit that converts the baseband signal into an electric power and generates a reference clock for a latch timing of the baseband signal output from the signal extracting unit based on the electric power.

Furthermore, according to still another aspect of the present invention, there is provided a timing regenerating device that regenerates a process timing for demodulating a reception signal in a spread spectrum communication system. The timing regenerating device includes a signal extracting unit that extracts a baseband signal from the reception signal on which an inverse spread processing is performed; and a reference clock generating unit that obtains a difference between a current baseband signal that is currently extracted by the signal extracting unit and a previous baseband signal that is previously extracted by the signal extracting unit and generates a reference clock for a latch timing of the baseband signal output from the signal extracting unit based on the difference.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1B is a schematic diagram of a configuration example of a receiving apparatus including a timing regenerating device according to the first embodiment;

FIG. 8B is a schematic diagram of a configuration example of a receiving apparatus according to the second embodiment;

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1A:
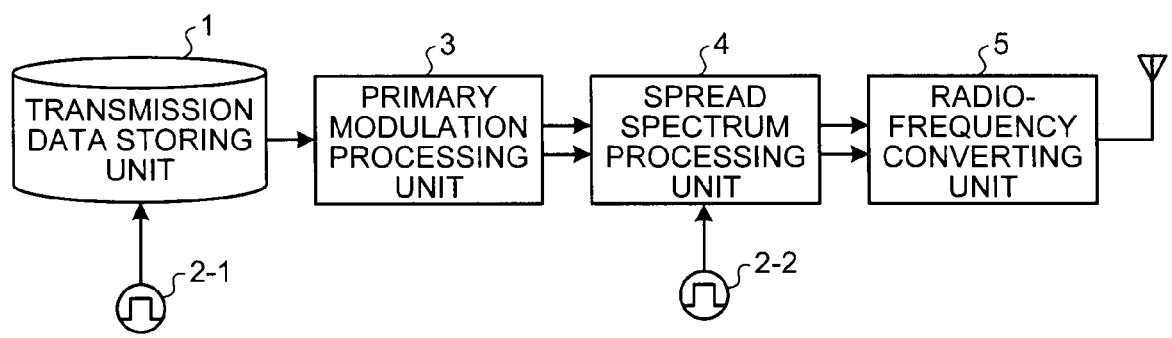
FIG. 1A is a schematic diagram of a configuration example of a transmitting apparatus that communicates with a receiving apparatus including a timing regenerating device in a communication system according to a first embodiment of the present invention.

FIG. 1A is a schematic diagram of a configuration example of a transmitting apparatus that communicates with a receiving apparatus including a timing regenerating device in a communication system according to a first embodiment of the present invention. FIG. 1B is a schematic diagram of a configuration example of a receiving apparatus including a timing regenerating device according to the first embodiment. The transmitting apparatus shown in FIG. 1A includes a transmission data storing unit 1, a bit-data clock generating unit 2-1, a chip-rate clock generating unit 2-2, a primary modulation processing unit 3, a spread spectrum processing unit 4, and a radio-frequency converting unit 5. The receiving apparatus shown in FIG. 1B includes an inverse spread processing unit 7, a baseband component extracting unit 8, a timing regenerating unit 9, a data latching unit 10, and an automatic gain control unit 11. The inverse spread processing unit 7 includes a spread code synchronizing unit 71 and a multiplying unit 72. The timing regenerating unit 9 includes an electric power converting unit 91, a cyclic addition performing unit 92, a maximum value detecting unit 93, and a regeneration clock generating unit 94. Two input terminals 101 and 102 are connected to the inverse spread processing unit 7. Signals received via an antenna (not shown) and subjected to frequency conversion from a radio-frequency band to a baseband are fed to the inverse spread processing unit 7 from the input terminals 101 and 102. For example, an I-channel signal (in-phase component) is fed from the input terminal 101 and a Q-channel signal (quadrature component) is fed from the input terminal 102. Two output terminals 103 and 104 are connected to the automatic gain control unit 11. The I-channel signal and the Q-channel signal processed in a predetermined manner in the receiving apparatus are output from the output terminals 103 and 104.

Figure 2:
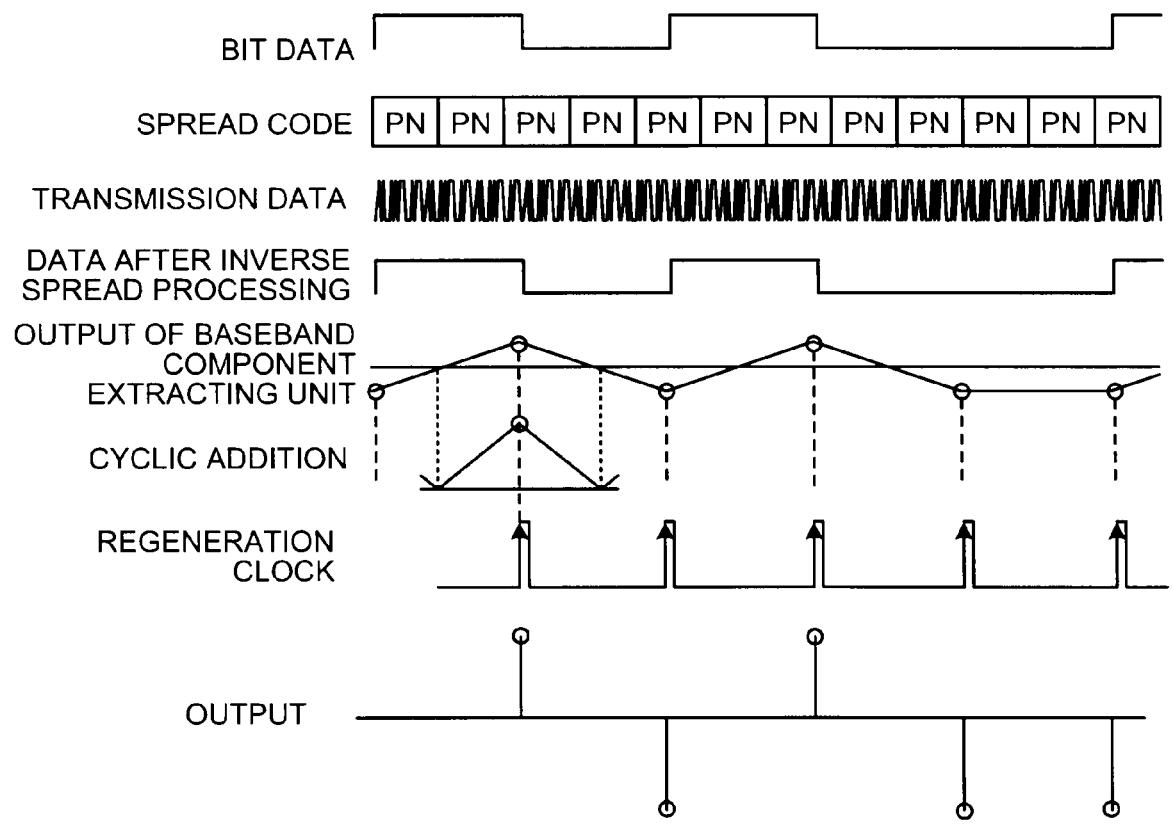
FIG. 2 is a schematic diagram for explaining an exemplary sequence of signal processing in the communication system.

Given below is the description with reference to FIG. 2 of operations performed when the transmitting apparatus shown in FIG. 1A transmits signals that the receiving apparatus shown in FIG. 1B receives. Thus, FIG. 2 is a schematic diagram for explaining an exemplary sequence of signal processing in the communication system according to the first embodiment. In the transmitting apparatus, transmission data to be eventually transmitted to the receiving apparatus is stored in the transmission data storing unit 1. The stored transmission data is sent to the primary modulation processing unit 3 at a timing based on a bit data clock generated by the bit-data clock generating unit 2-1. The primary modulation processing unit 3 performs primary modulation on the transmission data. Subsequently, the spread spectrum processing unit 4 performs spread spectrum processing by multiplying the primary-modulated transmission data with a spread code (pseudo random (PN) code) at a timing based on a chip-rate clock generated by the chip-rate clock generating unit 2-2.

Figure 3:
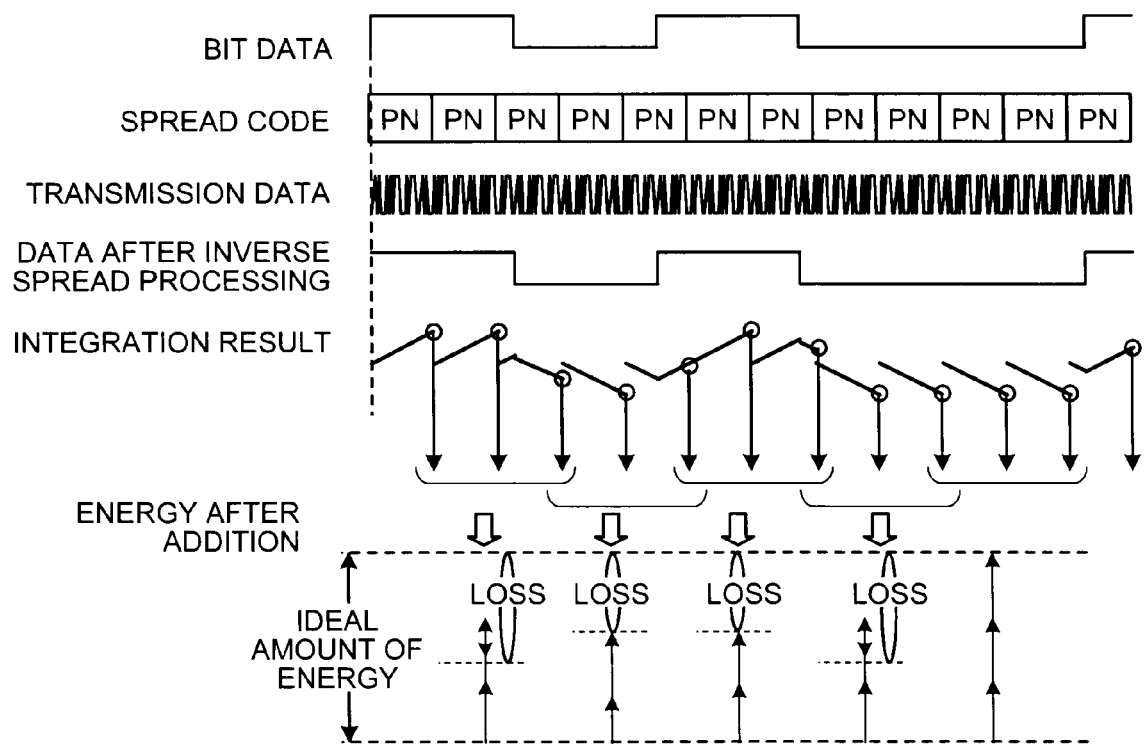
FIG. 3 is a schematic diagram of an exemplary case when the amount of energy of received data is less than the ideal amount of energy.

If the bit-rate clock and the chip-rate clock are in an asynchronous relation (not in a relation of integral multiples), then, as shown in FIG. 2, the bit data changes in mid-course of spread code periods indicated by blocks having "PN" written thereon. In that case, the amount of energy obtained when the receiving apparatus performs reception processing is sometimes less than the ideal amount of energy. FIG. 3 is a schematic diagram of an exemplary case when the amount of energy of received bit data is less than the ideal amount of energy. As shown in FIG. 3, if the bit data changes in mid-course of spread code periods, the amount of energy calculated by using the changed bit data (amount of energy after adding the integration results) is less than the ideal amount of energy.

Subsequent to spread spectrum processing of the transmission data by the spread spectrum processing unit 4, the radio-frequency converting unit 5 converts the transmission data into signals of a radio-frequency band and transmits them to the receiving apparatus via an antenna.

The receiving apparatus receives those signals via an antenna (not shown) and performs predetermined processing on the received signals. Subsequently, the I-channel signal and the Q-channel signal are fed to the inverse spread processing unit 7 via the input terminals 101 and 102, respectively. In the inverse spread processing unit 7, the spread code synchronizing unit 71 generates a spread code identical to the spread code used by the spread spectrum processing unit 4 for multiplication with the transmission data. Subsequently, the multiplying unit 72 performs inverse spread processing by multiplying the I-channel signal and the Q-channel signal with the generated spread code at an intended timing. The baseband component extracting unit 8 then extracts a baseband signal component from each of the I-channel signal and the Q-channel signal.

Figure 4:
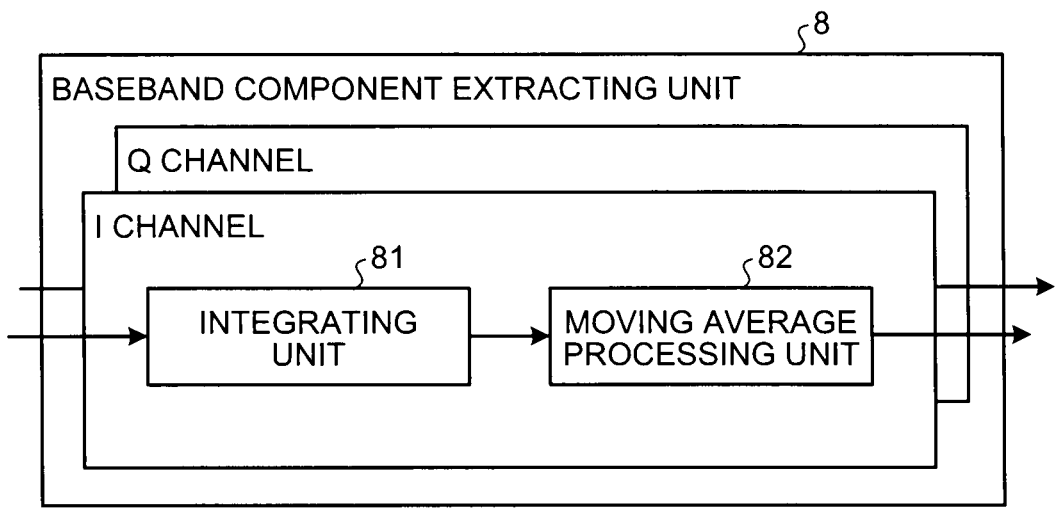
FIG. 4 is a schematic diagram of a configuration example of a baseband component extracting unit shown in FIG. 1B.

Given below is the detailed description of the operations performed by the baseband component extracting unit 8. FIG. 4 is a schematic diagram of a configuration example of the baseband component extracting unit 8. The baseband component extracting unit 8 includes an integrating unit 81 and a moving average processing unit 82. Meanwhile, to separately perform processing on the I-channel signal and the Q-channel signal, the integrating unit 81 and the moving average processing unit 82 are arranged in two pairs.

With respect to the I-channel signal and the Q-channel signal (i.e., with respect to the received signals after inverse spread processing), the integrating unit 81 performs down-sampling by performing integration over M sampling intervals (M is a positive integer), latching the integration result per period M (per M sampling intervals), and dividing the latching result by M. The moving average processing unit 82 performs moving average processing by using N number of downsampled signals. The result of moving average processing is shown as "output of baseband component extracting unit" in FIG. 2. Meanwhile, the reason for separately configuring the integrating unit 81 and the moving average processing unit 82 in the baseband component extracting unit 8 is to prevent increase in the circuit size when the number of sample bits is large. For example, assume that a signal of 120000 sample bits is to be processed when the baseband component extracting unit 8 includes only the moving average processing unit 82. In that case, the number of steps N increases to 120000 thereby making the circuit size substantially large.

However, when the baseband component extracting unit 8 includes the integrating unit 81 and the moving average processing unit 82, it becomes possible to process a signal of 120000 sample bits while reducing the circuit size. For example, the sampling period M in the integrating unit 81 can be set to 4000 and the number of steps N in the moving average processing unit 82 can be set to 30. Herein, it is desirable to set M and N such that the value of M×N is equal to the number of sample bits and by taking into consideration the fact that the necessary accuracy for demodulation is several tens of the number of sample bits. If the number of sample bits is a non-integer, it is desirable to set M and N such that the value of M×N is equal to the approximate integer value.

As shown in the "output of baseband component extracting unit" in FIG. 2, the baseband signal component has a waveform corresponding to the bit-period width of the bit data (i.e., a waveform in which changing points of the baseband signal component match with changing points of the bit data). Thus, the open dots in the "output of baseband component extracting unit" indicate ideal sampling points that correspond to the bit-period width and that, if sampled, enable demodulation without energy loss. Hereinafter, the ideal sampling points are referred to as data identification points.

The timing regenerating unit 9, which functions as a reference clock generating unit, uses the baseband signal component extracted by the baseband component extracting unit 8 to specify the positions of the data identification points. More particularly, when the timing regenerating unit 9 receives the baseband signal component from the baseband component extracting unit 8, the electric power converting unit 91 performs power conversion by calculating the sum of squares of the I-channel signal and the Q-channel signal (i.e., calculates the electric power of the received signal) and sends the obtained electric power to the cyclic addition performing unit 92. Then, the cyclic addition performing unit 92 performs IIR cyclic addition processing on the received electric power.

Figure 5:
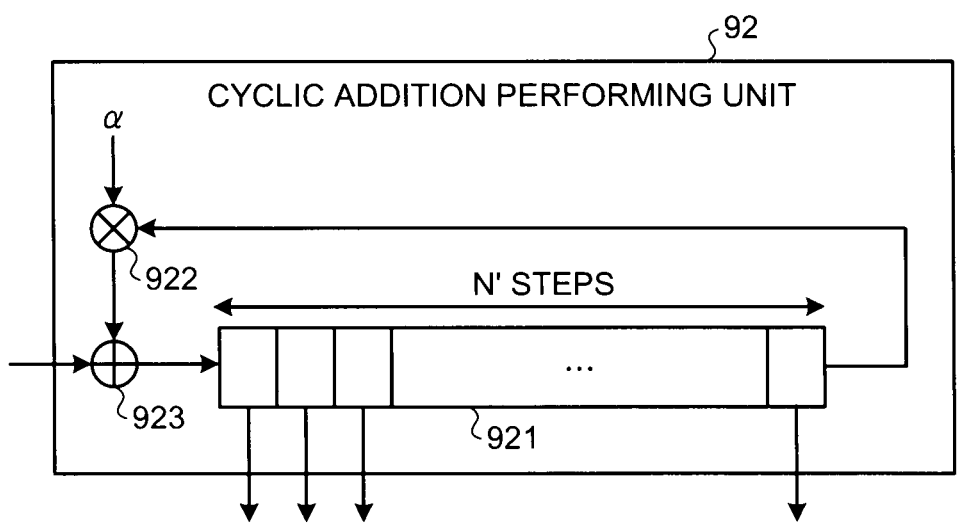
FIG. 5 is a schematic diagram of a configuration example of a cyclic addition performing unit shown in FIG. 1B.

FIG. 5 is a schematic diagram of a configuration example of the cyclic addition performing unit 92. The cyclic addition performing unit 92 includes a register unit 921 having N' number of registers, a multiplying unit 922 that multiplies the oldest value stored in the register unit 921 with an oblivion coefficient α (where, 0<α<1), and an adding unit 923 that adds the multiplied value to the electric power received from the electric power converting unit 91.

Subsequently, the adding unit 923 inputs the added value at the 0-th register of the register unit 921. Before inputting the added value at the 0-th register, the value stored at the K-th register (K=0, 1, 2, 3, . . . , N'−2) in the register unit 921 is shifted to the K+1-th register. Moreover, the value stored at the N'−1-th register in the register unit 921 (i.e., the oldest value stored at that point of time in the register unit 921) is output to the multiplying unit 922. The multiplying unit 922 multiplies the value stored at the N'−1-th register with the oblivion coefficient α and, as described above, the adding unit 923 adds that multiplied value to the electric power input from the electric power converting unit 91. Meanwhile, the oblivion coefficient α is set such that the values do not scatter by the repetition of IIR cyclic addition processing. For example, the oblivion coefficient α can be set in the form of $(2^n-1)/2^n$ (n=1, 2, . . . ) (e.g., 255/256 or 511/512). However, if the oblivion coefficient α is less than 1 (α<1), then the setting is not limited to the abovementioned form.

The maximum value detecting unit 93 functions as an information detecting unit and detects, at a period N' that is identical to number of steps N used in the moving average processing unit 82, a maximum value MxV and position information MxP. The maximum value MxV is the maximum value from among the values stored in the N' number of registers of the register unit 921. The position information MxP indicates the position of the maximum value MxV, i.e., the register in which the maximum value MxV is stored. Herein, the position information MxP is assumed to be a register number (0 to N'−1). As described above, upon receiving the electric power from the electric power converting unit 91, the information stored in each register of the register unit 921 is shifted by one register. Thus, the position information MxP indicates the rank order of inputting the maximum value MxV (temporal order of the maximum value MxV) from among all the values stored in the register unit 921. As shown in FIG. 2, the position of the maximum value from among the values obtained by IIR cyclic addition ("cyclic addition" in FIG. 2) matches with the position of an ideal data identification point corresponding to the signal output from the baseband component extracting unit 8.

Meanwhile, when the bit periods and the spread code periods are not in a relation of integral multiples, the period N' (number of steps) used by the cyclic addition performing unit 92 are changed accordingly. For example, if the baseband component extracting unit 8 performs downsampling to 20.02 sample bits, then N' can be changed from "20" to "21" once in 50 times such that the average of 50 times matches with the timing of the 20.02 sample bits.

Figure 6:
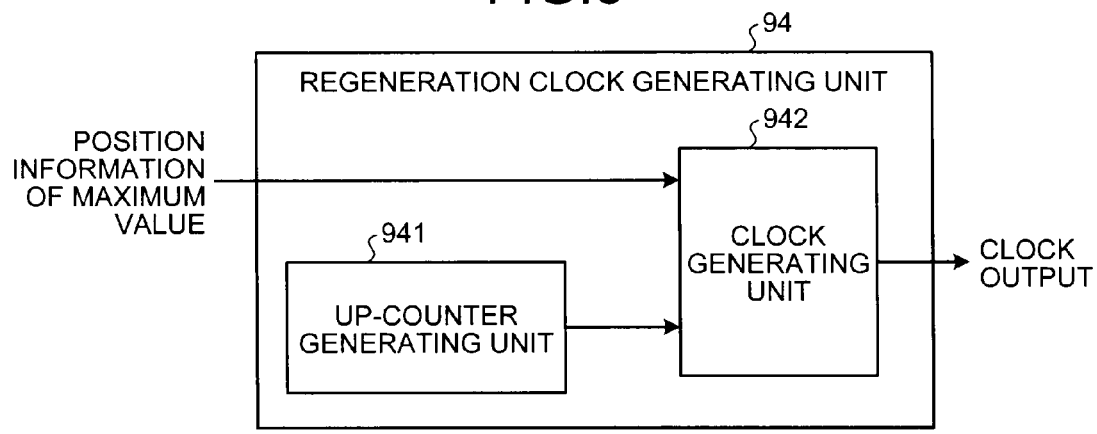
FIG. 6 is a schematic diagram of a configuration example of a regeneration clock generating unit shown in FIG. 1B.

The regeneration clock generating unit 94 uses the position information MxP, which indicates the register storing the maximum value MxV, and generates a clock having the leading edge at the position (ideal data identification point) of the maximum value MxV. FIG. 6 is a schematic diagram of a configuration example of the regeneration clock generating unit 94. The regeneration clock generating unit 94 includes an up-counter generating unit 941 and a clock generating unit 942. The up-counter generating unit 941 counts from 0 to (N−1) before returning to 0 (0→1→2→ . . . →(N−1)→0) and outputs the count number to the clock generating unit 942. The clock generating unit 942 generates a clock by comparing the position information MxP received from the maximum value detecting unit 93 and the count number received from the up-counter generating unit 941. For example, if the position information MxP is register numbers (0, 1, 2, 3, . . . ), then the clock generating unit 942 generates a clock by outputting "1" when the position information MxP matches with the output (0→1→2→ . . . ) of the up-counter generating unit 941 and outputting "0" in other cases.

As shown in FIG. 2, the phase of the generated clock ("regeneration clock" in FIG. 2) matches with the timing of the data identification points. That enables the data latching unit 10 sample the data identification points by latching the output signal of the baseband component extracting unit 8 at the leading edges of the generated clock. The result of latching ("output" in FIG. 2) is the output corresponding to the values of bit data.

Thus, by performing the abovementioned operations, the baseband signal component is extracted and data is latched at appropriate timings. That enables demodulation without much energy loss.

Figure 7:
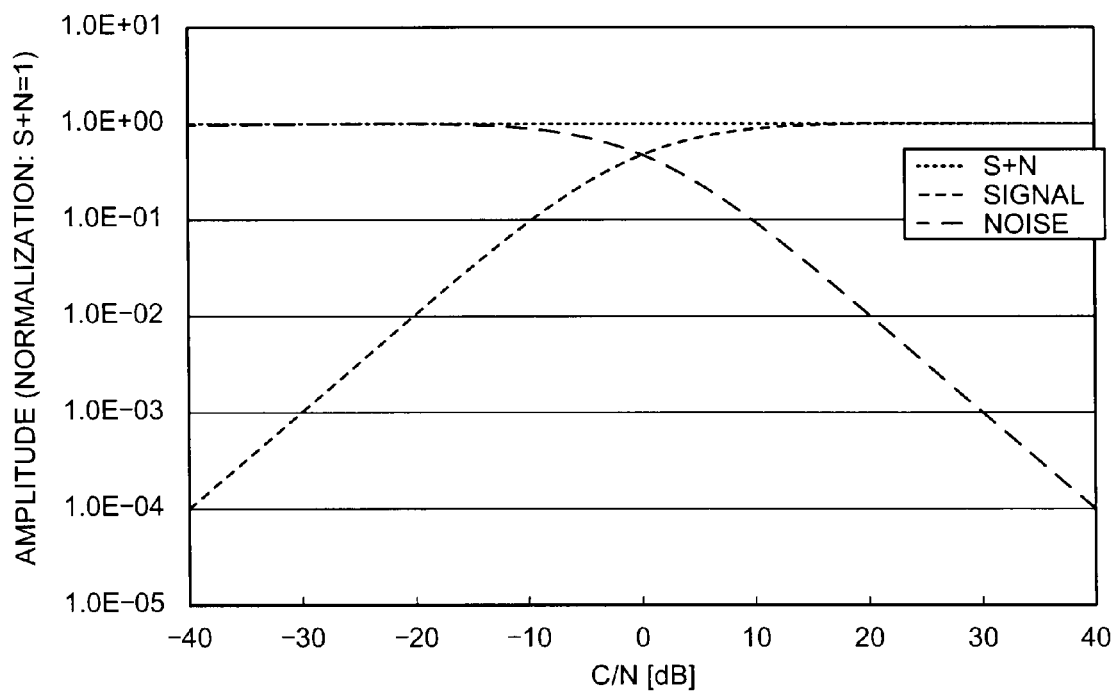
FIG. 7 is a graph for explaining a relation between the electric power of a signal component and the electric power of a noise component with respect to the signal power of a received signal.

The maximum value detecting unit 93 sends the maximum value MxV to the automatic gain control unit 11, which functions as a correcting unit. In spread spectrum communication, a noise component is predominant with respect to a signal component. If the amplitude level of each of the I-channel signal and the Q-channel signal fed through the input terminals 101 and 102 is normalized to "1" and if the signal power (S+N) of the received signal is obtained in that condition, then the electric power of the signal component (signal)

and the electric power of the noise component (noise) happens to be in a relation as shown in FIG. 7.

Generally, in a spread spectrum system, line design is performed with a low carrier-to-noise ratio (C/N) as the operating point. Assume that the received signal is controlled at constant amplitude before being fed to the inverse spread processing unit 7 through the input terminals 101 and 102. In that case, as is clear from FIG. 7, for C/N=−40 decibels (dB), the signal component (signal) becomes less than $\frac{1}{1000}$. On the other hand, for a high C/N ratio (e.g., C/N=0 decibel), the signal component (signal) becomes 0.5.

Thus, even if an analog automatic gain control (AGC) is arranged to maintain the received signal at constant amplitude prior to the inverse spread processing unit 7, the signal component (signal) extracted by the baseband component extracting unit 8 ranges, for example, for C/N equal to or greater than −40 decibels, between less than $\frac{1}{1000}$ to 1.0 according to the received C/N. If the signal component undergoes such fluctuation after passing through the baseband component extracting unit 8, then following problems occur:

(1) The bit width necessary for expressing the signal increases by the number of bits corresponding to the fluctuation of the signal component. That affects the subsequent circuit size.

(2) In the case of using soft-decision Viterbi decoding at a latter stage, the error correction capacity decreases.

(3) In a system that implements a modulation technique of appending bit information to amplitude as well (e.g. quadrature amplitude modulation (QAM) or amplitude phase shift keying (APSK)), the possibility of a bit determination error at the time of detecting the received signal increases.

To avoid such problems, the automatic gain control unit 11 corrects the amplitude level of the signal output from the baseband component extracting unit 8 and maintains the signal at constant amplitude. For that, the automatic gain control unit 11 divides the signal output from the data latching unit 10 by a value that is calculated based on the maximum value MxV and the oblivion coefficient α used in the cyclic addition performing unit 92.

For example, assume that output amplitude $Q_A'$ of the baseband component extracting unit 8 is one-tenth of an original signal $Q_A$ as follows $$Q_A = 10 Q_A' \quad (1)$$

Then, the electric power converting unit 91 raises $Q_A'$ to the second power and inputs it to the cyclic addition performing unit 92. If the oblivion coefficient α is $(2^n-1)/2^n$, then generally the result of IIR cyclic addition by continuing an input value 1 converges in $2^n$. Thus, the maximum value MxV from among the values stored in the N' number of registers of the register unit 921 can be expressed as follows.

$$MxV = \frac{1}{100}(Q_A)^2 \times 2^n \quad (2)$$

Based on the maximum value MxV, the automatic gain control unit 11 calculates an average amplitude A and divides the baseband signal component by the average amplitude A. In the present example, the average amplitude A can be obtained as follows.

$$A = \sqrt{\frac{MxV}{2^n}} \quad (3)$$

$$= \frac{Q_A}{10}$$

When the signal $Q_A'$ is divided by the average amplitude A to obtain a signal $Q_A''$, the result is "1" indicating that the amplitude is normalized.

$$Q_A'' = \frac{Q_A'}{A} \quad (4)$$

$$= \frac{Q_A}{10} \times \frac{10}{Q_A}$$

$$= 1$$

Finally, each of the I-channel signal and the Q-channel signal with corrected amplitude are output from the output terminals 103 and 104, respectively. In this way, the automatic gain control unit 11 can use the maximum value MxV, which is originally detected by the maximum value detecting unit 93 for generating the regeneration clock. That eliminates the need of arranging a separate circuit for calculating the average amplitude and facilitates circuit sharing.

In this way, according to the first embodiment, the electric power converting unit 91 converts the baseband signal component into an electric power. The cyclic addition performing unit 92 performs IIR cyclic addition on the electric power. The maximum value detecting unit 93 repeatedly detects, for every predetermined period (bit period), the maximum value from among the values stored in the cyclic addition performing unit 92 and the position of the register in which the maximum value is stored. Based on the information of the detected position, the regeneration clock generating unit 94 generates a reference clock for latch timings for the baseband signal component. As a result, in the receiving apparatus of a communication system in which the bit data cycles and the spread code periods are not in synchronization, it is possible to accurately detect the bit period (i.e., to latch the baseband signal component at suitable timings) and perform demodulation without much energy loss (i.e., without much decline in bit error rate performance). Moreover, use of the detected maximum value in correcting the amplitude level of the latched baseband signal component enables to reduce the circuit size.

Given below is the description according a second embodiment of the present invention. In the second embodiment, description is given about a receiving apparatus that, in an asynchronous system in which bit data cycles and spread code periods are not in a relation of integral multiples, performs demodulation without much energy loss (i.e., without much decline in bit error rate performance) and, even when a plurality of bit rates are available for transmission and the bit rate actually used for transmission is not known, detects the bit rate used for transmission and performs correct demodulation without much energy loss.

In the line design of a communication system, the bit rate for data transmission is determined by taking into consideration the worst condition of the transmission path. However, in that case, the bit rate suitable for the worst condition of the transmission path is used even when the condition of the transmission path improves. That is not desirable from the perspective of frequency use efficiency. Thus, if it is possible to change the transmission bit rate according to the condition of the transmission path, then a higher bit rate can be used when the transmission path is in good condition. That enables to reduce the transmission time and make efficient use of the frequency.

Figure 8A:
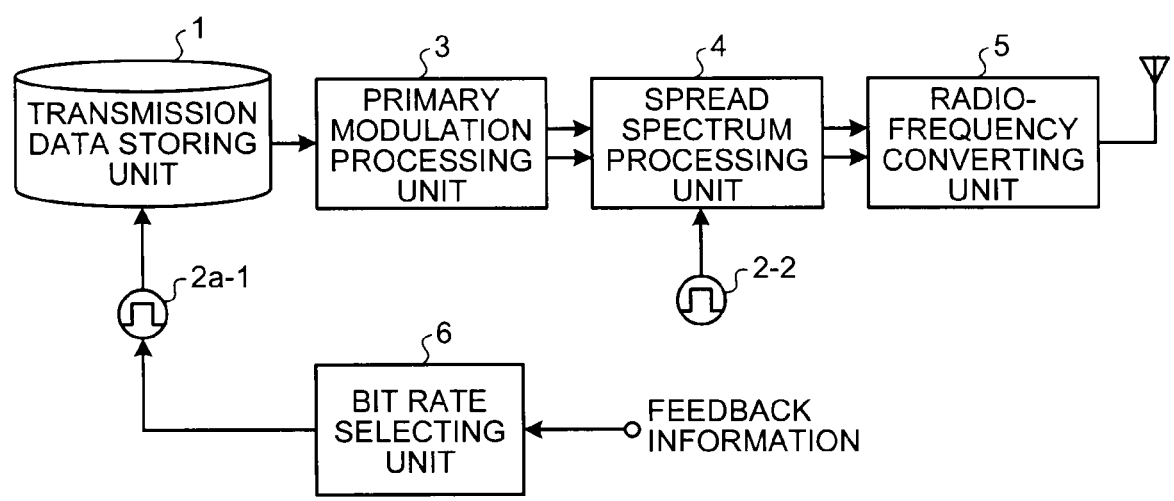
FIG. 8A is a schematic diagram of a configuration example of a transmitting apparatus according to a second embodiment of the present invention.

FIG. 8A is a schematic diagram of a configuration example of a transmitting apparatus according to the second embodiment. FIG. 8B is a schematic diagram of a configuration example of a receiving apparatus according to the second embodiment.

The transmitting apparatus shown in FIG. 8A has a similar configuration to the transmitting apparatus according to the first embodiment (see FIG. 1A), except that the transmitting apparatus shown in FIG. 8A includes a bit-data clock generating unit 2a-11 in place of the bit-data clock generating unit 2-1 and additionally includes a bit rate selecting unit 6. The remaining constituent elements identical to those in the transmitting apparatus according to the first embodiment are referred to by the same reference numerals and their description is not repeated.

The receiving apparatus shown in FIG. 8B includes the inverse spread processing unit 7 identical to that in the receiving apparatus according to the first embodiment (see FIG. 1B). Moreover, each of the baseband component extracting unit 8, the timing regenerating unit 9, the data latching unit 10, and the automatic gain control unit 11 identical to that in the receiving apparatus according to the first embodiment is arranged in plurality (e.g., three in this case) in the receiving apparatus shown in FIG. 8B. Furthermore, the receiving apparatus shown in FIG. 8B also includes a determining unit 12 and a selecting unit 13.

Thus, baseband component extracting units 8-1, 8-2, and 8-3, timing regenerating units 9a-1, 9a-2, and 9a-3, data latching units 10-1, 10-2, and 10-3, and automatic gain control units 11-1, 11-2 and 11-3 in the receiving apparatus shown in FIG. 8A are identical to the baseband component extracting unit 8, the timing regenerating unit 9, the data latching unit 10, and the automatic gain control unit 11, respectively, shown in FIG. 1B. Hence, that description is not repeated in the second embodiment.

Figure 9:
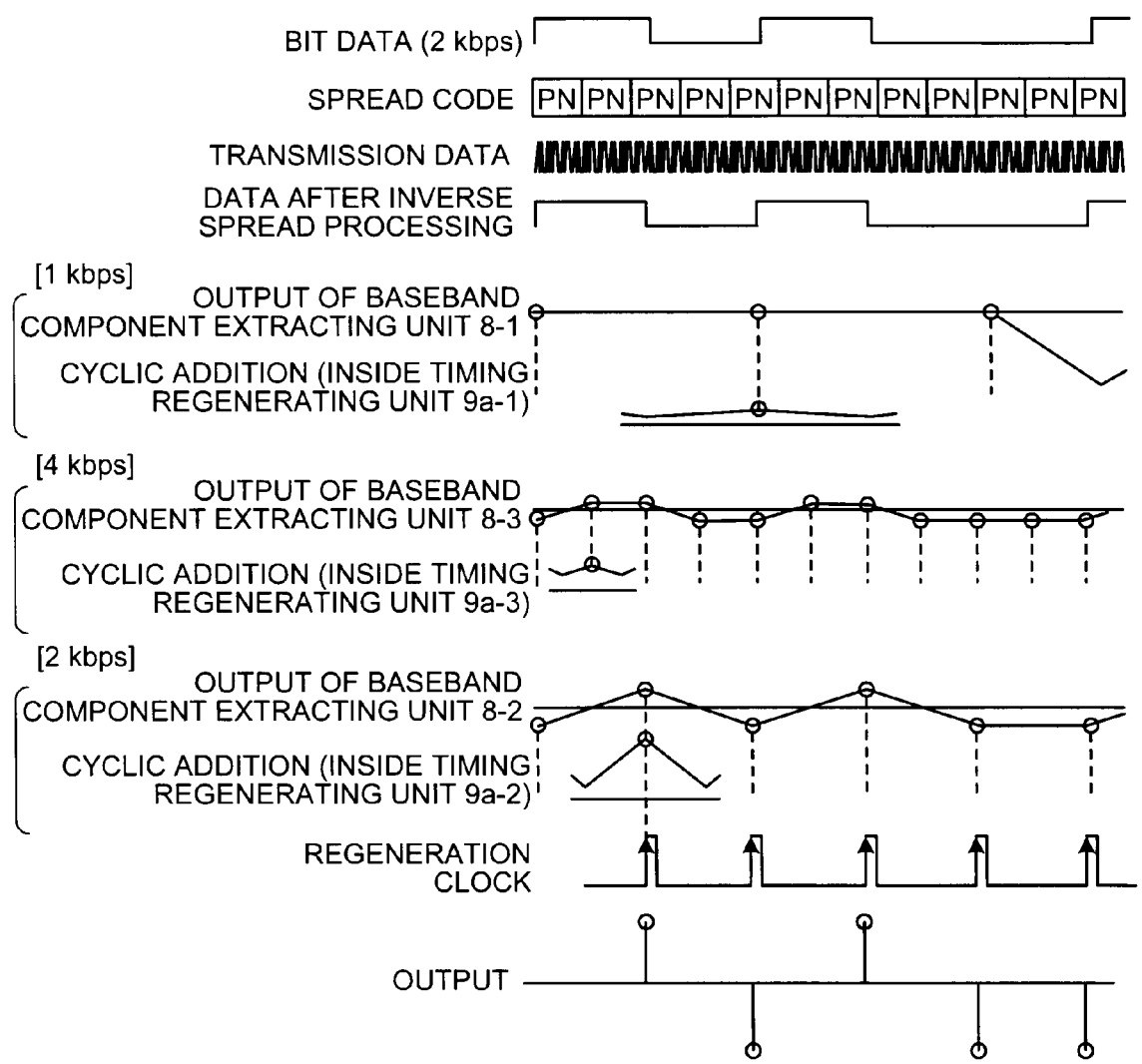
FIG. 9 is a schematic diagram for explaining an exemplary sequence of signal processing in a communication system according to the second embodiment.

Given below is the description of the communication activity according to the second embodiment. Herein, it is assumed that the transmitting apparatus transmits signals at an arbitrary bit rate that is selected from bit rates of 1 kilobits per second (kbps), 2 kbps, and 4 kbps, and the receiving apparatus is not aware of the selected bit rate. FIG. 9 is a schematic diagram for explaining an exemplary sequence of signal processing in a communication system according to the second embodiment when the bit rate for transmission is 2 kbps.

The bit rate selecting unit 6 in the transmitting apparatus obtains feedback information regarding the condition of the transmission path and, based on the feedback information, selects a bit rate to be used for transmission from among the selectable bit rates. In the present example, the selectable bit rates are 1 kbps, 2 kbps, and 4 kbps. The selected bit rate is sent to the bit-data clock generating unit 2a-1. Meanwhile, if it is known that the condition of the transmission path temporally changes from bad to good, then the bit rate selecting unit 6 can be configured to select a bit rate by taking into consideration the temporal change in the condition of the transmission path without using the feedback information. Moreover, if the communication distance to the receiving apparatus is known, it is possible to assume that, when the communication distance is small, the transmitting path is in good condition and, when the communication distance is large, the transmitting path is in bad condition, and such assumptions can be used in selecting a bit rate. Furthermore, it is also possible to select a bit rate based on the electric power or the signal-to-noise ratio (S/N) of the received signal obtained by telemetry. Moreover, it is also possible to select a bit rate based on the information obtained by user operations.

The bit-data clock generating unit 2a-1 generates a clock according to the bit rate selected by the bit rate selecting unit 6. The transmission data storing unit 1, the primary modulation processing unit 3, the spread spectrum processing unit 4, and the radio-frequency converting unit 5 perform processing identical to that described in the first embodiment. The processed transmission data is then transmitted to the receiving apparatus.

The inverse spread processing unit 7 in the receiving apparatus performs inverse spread processing identical to that described in the first embodiment and sends the I-channel signal and the Q-channel signal to the baseband component extracting units 8-1, 8-2, and 8-3. The three baseband component extracting units 8-1, 8-2, and 8-3 are arranged corresponding to the three selectable bit rates of 1 kbps, 2 kbps, and 4 kbps. Herein, it is assumed that the baseband component extracting unit 8-1 is corresponding to the bit rate of 1 kbps, the baseband component extracting unit 8-2 is corresponding to the bit rate of 2 kbps, and the baseband component extracting unit 8-3 is corresponding to the bit rate of 4 kbps. In an identical manner, the timing regenerating units 9a-1, 9a-2, and 9a-3, the data latching units 10-1, 10-2, and 10-3, and the automatic gain control units 11-1, 11-2 and 11-3 are also arranged corresponding to the three selectable bit rates of 1 kbps, 2 kbps, and 4 kbps.

Identical to the description in the first embodiment, each of the baseband component extracting units 8-1, 8-2, and 8-3 includes the integrating unit 81 and the moving average processing unit 82. However, the sampling period M in the integrating unit 81 and the number of steps N in the moving average processing unit 82 in each of the baseband component extracting units 8-1, 8-2, and 8-3 are set according to the corresponding bit rate (1 kbps, 2 kbps, and 4 kbps, respectively). For example, in the baseband component extracting unit 8-2 corresponding to the bit rate of 2 kbps, the sampling period M is set to 4000 and the number of steps N is set to 30. Similarly, in the baseband component extracting unit 8-1 corresponding to the bit rate of 1 kbps, the sampling period M is set to 8000 and the number of steps N is set to 30. Moreover, in the baseband component extracting unit 8-3 corresponding to the bit rate of 4 kbps, the sampling period M is set to 2000 and the number of steps N is set to 30.

Figure 10:
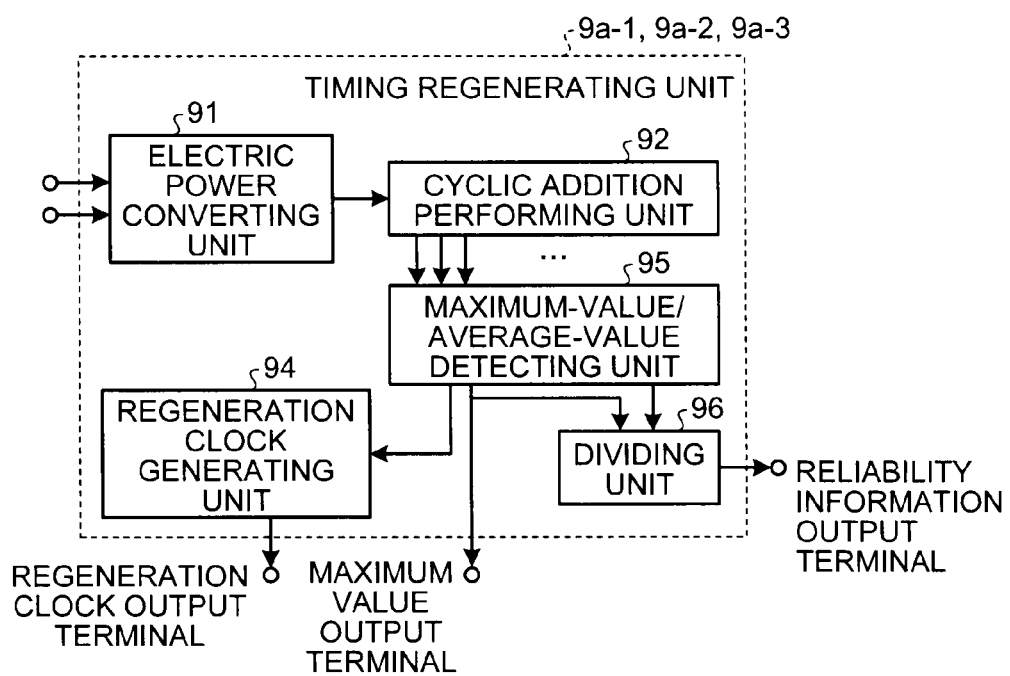
FIG. 10 is a schematic diagram of a configuration example of a timing regenerating unit according to the second embodiment.

The baseband signal components extracted by the baseband component extracting units 8-1, 8-2, and 8-3 are input to the timing regenerating units 9a-1, 9a-2, and 9a-3, respectively. Each of the timing regenerating units 9a-1, 9a-2, and 9a-3 has an identical configuration as shown in FIG. 10. The configuration shown in FIG. 10 is similar to the configuration of the timing regenerating unit 9 according to the first embodiment (see FIG. 1B), except that a maximum-value/average-value detecting unit 95 is arranged instead of the maximum value detecting unit 93 and a dividing unit 96 is additionally included. The dividing unit 96 functions as a reliability information calculating unit. The remaining constituent elements in FIG. 10 that are identical to those in the timing regenerating unit 9 according to the first embodiment are referred to by the same reference numerals and their description is not repeated.

In an identical manner to the maximum value detecting unit 93, the maximum-value/average-value detecting unit 95 detects, at the period N' that is identical to the number of steps N used in the moving average processing unit 82, the maximum value MxV and the position information MxP. As described above, the maximum value MxV is the maximum value from among the values stored in the N' number of registers of the register unit 921 and the position information MxP indicates the position at which the maximum value MxV is stored. In addition, the maximum-value/average-value detecting unit 95 also calculates an average value AvV that is the average of the values stored in the N' number of registers of the register unit 921. The dividing unit 96 divides the maximum value MxV by the average value AvV to obtain reliability information $R_n$ and outputs it to the determining unit 12. This operation is equivalent to obtaining autocorrelation between a data series raised to the second power in the electric power converting unit 91 and a data series obtained by one-symbol delaying the abovementioned data series. The reliability information $R_n$ can be expressed as follows.

$$R_n = MxV/AvV \qquad (5)$$

Figure 11:
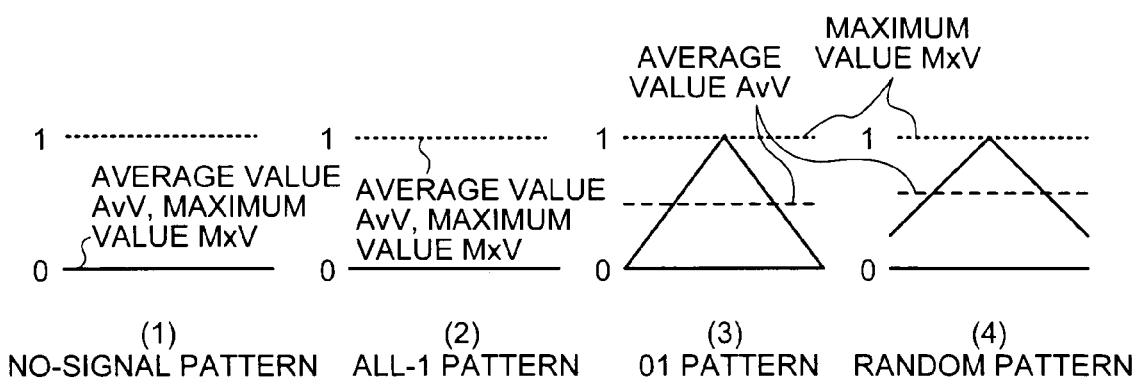
FIG. 11 is a schematic diagram of an exemplar result of infinite impulse response (IIR) cyclic addition performed by a cyclic addition performing unit shown in FIG. 10.

The description regarding the reliability information $R_n$ is given with reference to FIG. 11. FIG. 11 is a schematic diagram of the result of IIR cyclic addition when information of following four patterns is transmitted.

Pattern 1: no-signal pattern (0, 0, 0, 0, 0, . . . )
Pattern 2: all-1 pattern (1, 1, 1, 1, 1, . . . )
Pattern 3: 01 pattern ("−1" and "1" appear alternatively (−1, 1, −1, 1, −1, 1, . . . ))
Pattern 4: random pattern without any regularity (−1, 1, 1, −1, 1, −1, . . . )

Herein, it is assumed that the transmitting apparatus transmits the information at the bit rate of 2 kbps and the baseband component extracting unit 8-2 in the receiving apparatus extracts the baseband signal component and outputs it to the timing regenerating unit 9a-2.

As shown in FIG. 11, for the pattern 1 (no-signal pattern or all-0 pattern), each of the maximum value MxV and the average value AvV is about "0" and the corresponding reliability information $R_n$ (hereinafter, "reliability information $R^1$") becomes about "1". Similarly, for the pattern 2 (all-1 pattern), each of the maximum value MxV and the average value AvV is about "0" and the corresponding reliability information $R_n$ (hereinafter, "reliability information $R_2$") becomes about "1". For the pattern 3 (01 pattern), the maximum value MxV is about "1", the average value AvV is about "0.5", and the corresponding reliability information $R_n$ (hereinafter, "reliability information $R_3$") becomes about "2". For the pattern 4 (random pattern), the maximum value MxV is about "1", the average value AvV is between "0.5" to "1", and the corresponding reliability information $R_n$ (hereinafter, "reliability information $R_4$") is between "1" and "2". Thus, the relation between the reliability information $R_n$ (n∈{1, 2, 3, 4}) of the four patterns shown in FIG. 11 can be expressed as given below.

$$R_3 > R_4 > R_2 \approx R_1 \qquad (6)$$

The value of the reliability information $R_3$ corresponding to the pattern 3 (01 pattern) is maximum from among the reliability information $R_n$ of the four patterns. Thus, it can be said that the reliability information $R_n$ is directly proportional to the difference between the maximum value MxV and the average value AvV.

Given below is the description regarding reliability information obtained in the timing regenerating unit 9a-1 (hereinafter," reliability information $R_{9a-1}$) that is arranged corresponding to the bit rate of 1 kbps, reliability information obtained in the timing regenerating unit 9a-2 (hereinafter," reliability information $R_{9a-2}$) that is arranged corresponding to the bit rate of 2 kbps, and reliability information obtained in the timing regenerating unit 9a-3 (hereinafter," reliability information $R_{9a-3}$) that is arranged corresponding to the bit rate of 4 kbps.

In the example shown in FIG. 9, it is assumed that the bit rate of 2 kbps is used for transmission. Under that assumption, the output of each of the baseband component extracting units 8-1, 8-2, and 8-3 and the IIR cyclic addition output of each of the timing regenerating units 9a-1, 9a-2, and 9a-3 arranged corresponding to the bit rates of 1 kbps, 2 kbps, and 4 kbps, respectively, is shown in FIG. 9.

Consider the case of demodulation performed with the baseband component extracting unit 8-1 and the timing regenerating unit 9a-1 that are arranged corresponding to the bit rate of 1 kbps. In that case, the baseband component extracting unit 8-1 performs moving average processing at the bit data cycles for the bit rate of 1 kbps, i.e., at the bit data cycles that are double the bit data cycles for the bit rate of 2 kbps. Thus, if two adjacent bits are different (e.g., {0, 1}), the output of the baseband component extracting unit 8-1 becomes close to almost zero as shown in FIG. 9. Consequently, the result of IIR cyclic addition happens to be as shown in FIG. 9 and the difference between the maximum value MxV and the average value AvV is smaller than in the case of the bit rate of 2 kbps. As a result, the value of the reliability information $R_{9a-1}$, which the timing regenerating unit 9a-1 calculates by dividing the corresponding maximum value MxV and the corresponding average value AvV, is smaller than the value of the reliability information $R_{9a-2}$, which the timing regenerating unit 9a-2 calculates by dividing the corresponding maximum value MxV and the corresponding average value AvV.

Similarly, consider a case of demodulation performed with the baseband component extracting unit 8-3 and the timing regenerating unit 9a-3 that are arranged corresponding to the bit rate of 4 kbps. In that case, the baseband component extracting unit 8-3 performs moving average processing at the bit data cycles for the bit rate of 4 kbps, i.e., at the bit data cycles that are half the bit data cycles for the bit rate of 2 kbps. Thus, if two adjacent bits are different (e.g., {0, 1}) and if the maximum amplitude is assumed to be "1" and the minimum amplitude is assumed to be "−1", a non-transition condition such as 1→1 or −1→−1 occurs as shown in FIG. 9. Consequently, the result of IIR cyclic addition happens to be as shown in FIG. 9 and the difference between the maximum value MxV and the average value AvV is smaller than in the case of the bit rate of 2 kbps. As a result, the value of the reliability information $R_{9a-3}$ is smaller than the value of the reliability information $R_{9a-2}$ corresponding to the bit rate of 2 kbps.

Thus, the relation between the reliability information $R_{9a-1}$ corresponding to the bit rate of 1 kbps, the reliability information $R_{9a-2}$ corresponding to the bit rate of 2 kbps, and the reliability information $R_{9a-3}$ corresponding to the bit rate of 4 kbps can be expressed as given below.

$$R_{9a-2} > R_{9a-1}, R_{9a-3} \qquad (7)$$

The determining unit 12 compares the reliability information $R_{9a-1}$, the reliability information $R_{9a-2}$, and the reliability information $R_{9a-3}$ obtained from the timing regenerating units 9a-1, 9a-2, and 9a-3, respectively, detects the reliability information $R_n$ of maximum value, and sends the information regarding the input terminal corresponding to the reliability information $R_n$ of maximum value to the selecting unit 13. In the present example, because the reliability information $R_{9a-2}$ is the reliability information $R_n$ of maximum value, data latching is performed based on the information (regeneration clock, maximum value) output by the timing regenerating unit 9a-2. In addition, the determining unit 12 sends the information for identifying a signal with corrected amplitude to the selecting unit 13. Meanwhile, the operations performed by the data latching unit 10-1 and the automatic gain control unit 11-1 that correspond to the timing regenerating unit 9a-1 and are arranged for the bit rate of 1 kbps, the operations performed by the data latching unit 10-2 and the automatic gain control unit 11-2 that correspond to the timing regenerating unit 9a-2 and are arranged for the bit rate of 2 kbps, and the operations performed by the data latching unit 10-3 and the automatic gain control unit 11-3 that correspond to the timing regenerating unit 9a-3 and are arranged for the bit rate of 4 kbps are identical to the operations performed by the data latching unit 10 and the automatic gain control unit 11, respectively, according to the first embodiment. Hence, that description is not repeated in the second embodiment.

Upon receiving the information regarding the input terminal corresponding to the reliability information $R_n$ of maximum value, the selecting unit 13 opens only that particular input terminal. As a result, only the signal that corresponds to the timing regenerating unit having the reliability information $R_n$ of maximum value is output. Thus, in the present example, only the signal obtained from the automatic gain control unit 11-2 corresponding to the timing regenerating unit 9a-2 arranged for the bit rate of 2 kbps is output.

In this way, even when a plurality of bit rates such as the bit rates of 1 kbps, 2 kbps, and 4 kbps in the present example are available for transmission and the bit rate actually used for transmission is not known to the receiving apparatus, the receiving apparatus is able to detect the bit rate actually used for transmission and output correct demodulation result (in the present example, the demodulation result of the circuit for the bit rate of 2 kbps). Moreover, identical to the first embodiment, demodulation is performed without much energy loss.

Meanwhile, although the above description is given for the example in which the bit rate of 2 kbps is used for transmission, it is also possible to select the correct demodulation result even if the bit rate of 1 kbps or 4 kbps is used for transmission.

Figure 12:
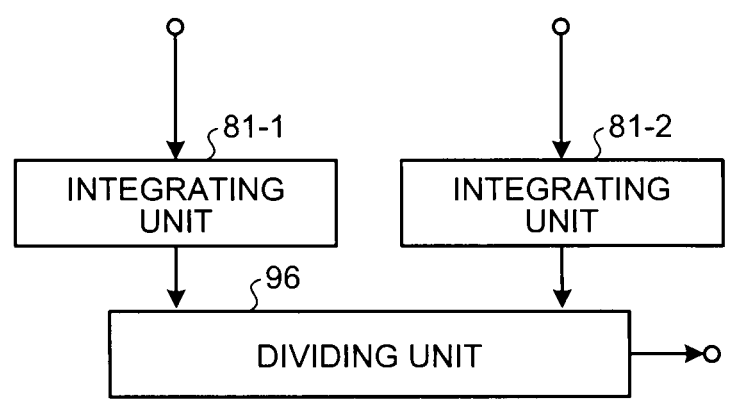
FIG. 12 is a schematic diagram of another exemplary configuration of a dividing unit shown in FIG. 10.

Moreover, as a method of stabilizing the reliability information $R_n$, it is possible to arrange integrating units 81-1 and 81-2 prior to the dividing unit 96 in each of the timing regenerating units 9a-1, 9a-2, and 9a-3 (see FIG. 12). For example, the integrating unit 81-1 can be used to integrate the maximum value MxV and the integrating unit 81-2 can be used to integrate the average value AvV for N' times, N' being equal to the period N' used by the maximum-value/average-value detecting unit 95 for detecting the maximum value MxV. In that case, the dividing unit 96 can calculate the reliability information $R_n$ by dividing the maximum value MxV by the average value AvV output from the integrating unit 81-1 and 81-2, respectively.

In the present example, it is assumed that three different bit rates are available for transmission. However, if the baseband component extracting unit, the timing regenerating unit, the data latching unit, and the automatic gain control unit are arranged in plurality and equal to the number of bit rates, then it is possible to freely set the number of available bit rates. Moreover, because demodulation can be performed without much energy loss even in an asynchronous system in which bit data cycles and spread code periods are not in a relation of integral multiples, there is no restriction on setting an arbitrary bit rate for transmission.

In this way, in the receiving apparatus according to the second embodiment, the number of processing blocks including a baseband component extracting unit, a timing regenerating unit, a data latching unit, and an automatic gain control unit is equal to the number of selectable bit rates for transmission. The timing regenerating unit in each processing block calculates reliability information based on the information held by a cyclic addition performing unit arranged therein. Subsequently, data latching is performed in that processing block in which the reliability information of maximum value is obtained and demodulation is performed by selecting the signal with corrected amplitude. As a result, identical to the advantage according to the first embodiment, demodulation can be performed without much decline in bit error rate performance even in an asynchronous system in which bit data cycles and spread code periods are not in a relation of integral multiples. In addition, even when a plurality of bit rates are available for transmission and the bit rate actually used for transmission is not known, it is possible to detect the bit rate used for transmission and perform correct demodulation of the received signal.

Given below is the description according to a third embodiment of the present invention. In the description according to the second embodiment, the baseband component extracting units, the timing regenerating units, the data latching units, and the automatic gain control units are arranged in plurality corresponding to the number of bit rates available for transmission. In comparison, according to the third embodiment, a single baseband component extracting unit, a single timing regenerating unit, a single data latching unit, and a single automatic gain control unit are arranged from the perspective of circuit sharing and bit rate detection is performed for the number of times equal to the total number of available bit rates. That is, unlike in the case according to the second embodiment in which reliability information $R_n$ corresponding to all available bit rates is obtained at once, the reliability information $R_n$ corresponding to each available bit rate is separately obtained by sequentially changing the settings of the baseband component extracting unit and the timing regenerating unit.

Figure 13:
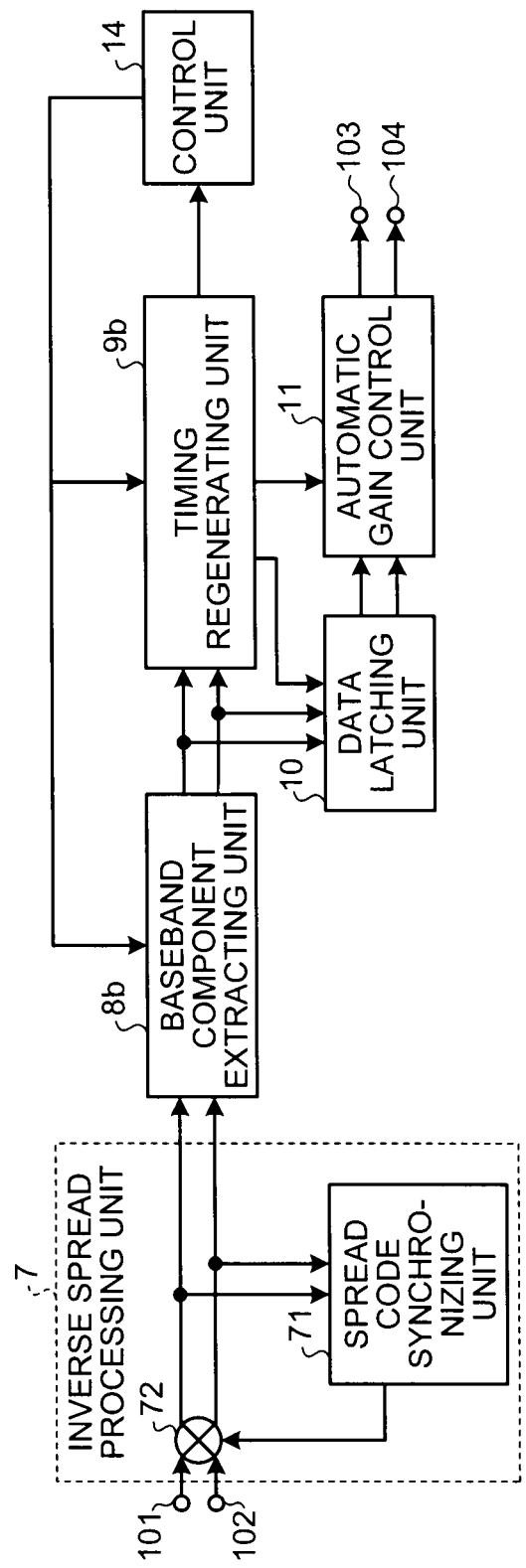
FIG. 13 is a schematic diagram of a configuration example of a receiving apparatus according to a third embodiment of the present invention.

FIG. 13 is a schematic diagram of a configuration example of a receiving apparatus according to the third embodiment. The receiving apparatus according to the third embodiment has a similar configuration to that of the receiving apparatus according to the first embodiment (see FIG. 1B), except that the receiving apparatus according to the third embodiment includes a baseband component extracting unit 8b and a timing regenerating unit 9b instead of the baseband component extracting unit 8 and the timing regenerating unit 9 and a control unit 14 is additionally included. The control unit 14 functions as a bit rate identifying unit. The remaining constituent elements in FIG. 13 that are identical to those in the receiving apparatus according to the first embodiment are referred to by the same reference numerals and their description is not repeated. The baseband component extracting unit 8b includes, in an identical manner to that of the baseband component extracting unit 8 according to the first embodiment (see FIG. 4), the integrating unit 81 and the moving average processing unit 82 arranged in two pairs corresponding to the I-channel signal and the Q-channel signal. The timing regenerating unit 9b includes, in an identical manner to that of the timing regenerating units 9a-1, 9a-2, and 9a-3 according to the second embodiment (see FIG. 10), the electric power converting unit 91, the cyclic addition performing unit 92, the regeneration clock generating unit 94, the maximum-value/average-value detecting unit 95, and the dividing unit 96.

The control unit 14 instructs the baseband component extracting unit 8b and the timing regenerating unit 9b to perform demodulation processing corresponding to a particular bit rate. Accordingly, the baseband component extracting unit 8b changes the sampling period M in the integrating unit 81 and the number of steps N in the moving average processing unit 82 and performs baseband component extraction processing. Subsequently, the timing regenerating unit 9b changes the number of registers in the cyclic addition performing unit 92, changes the period (corresponding to the abovementioned period N') at which the maximum-value/average-value detecting unit 95 detects the maximum value MxV, and generates the regeneration clock, the maximum value MxV, and the reliability information $R_n$. Meanwhile, a transmitting apparatus according the third embodiment has an identical configuration to that of the transmitting apparatus according to the second embodiment (see FIG. 8A).

Figure 14:
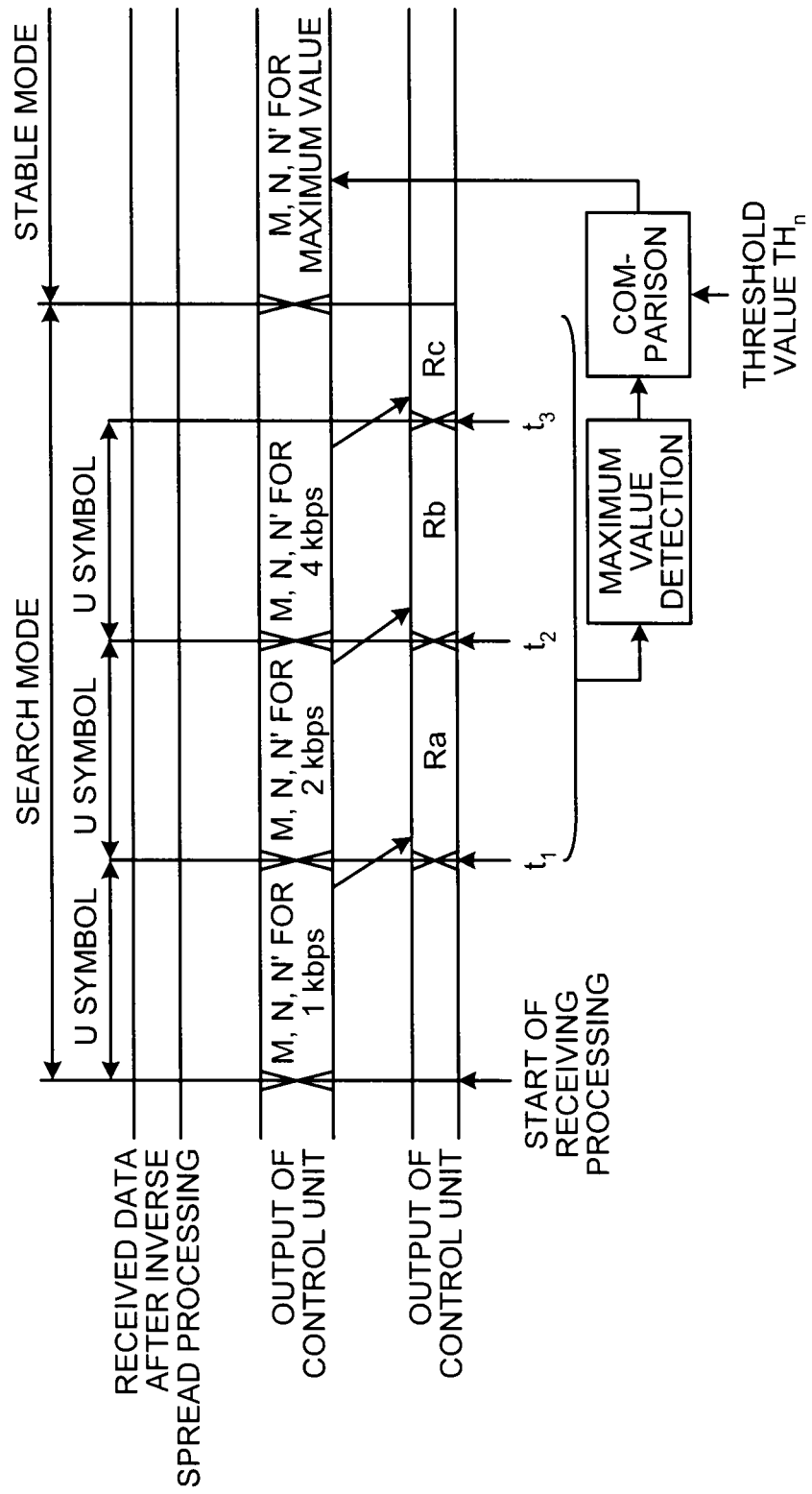
FIG. 14 is a schematic diagram for explaining an exemplary processing performed in the receiving apparatus shown in FIG. 13.

FIG. 14 is a schematic diagram for explaining an exemplary processing performed in the receiving apparatus. In an identical manner to the second embodiment, the description with reference to FIG. 14 is given under the assumption that the transmitting apparatus transmits data at an arbitrary bit rate that is selected from available bit rates of 1 kbps, 2 kbps, and 4 kbps and the receiving apparatus is not aware of the selected bit rate.

The control unit 14 holds set values (sampling period M, number of steps N, period N') corresponding to each available bit rate. When the receiving apparatus starts receiving the transmission data, the control unit 14 notifies the values of the sampling period M and the number of steps N corresponding to the bit rate of 1 kbps to the baseband component extracting unit 8b, notifies the value of the period N' corresponding to the bit rate of 1 kbps to the timing regenerating unit 9b, and instructs the baseband component extracting unit 8b and the timing regenerating unit 9b to perform demodulation processing by using the notified information. Accordingly, the baseband component extracting unit 8b and the timing regenerating unit 9b change their respective setting corresponding to the received information and perform demodulation processing by using the received information for a predetermined time span referred to as U symbol. Herein, U can be determined from the oblivion coefficient α set in the cyclic addition performing unit 92. For example, if the oblivion coefficient α is $(2^n-1)/2^n$, the demodulation processing can be performed with U=$2^n$[symbol]. The demodulation processing corresponding to the bit rate of 1 kbps performed by the baseband component extracting unit 8b and the timing regenerating unit 9b is identical to the demodulation processing performed by the baseband component extracting unit 8-1 and the timing regenerating unit 9a-1 in the second embodiment. Subsequently, the control unit 14 obtains reliability information $R_a$ from the timing regenerating unit 9b at a time $t_1$ shown in FIG. 14.

Similarly, the control unit 14 notifies the values of the sampling period M, the number of steps N, and the period N' corresponding to the bit rate of 2 kbps to the baseband component extracting unit 8b and the timing regenerating unit 9b, and instructs the baseband component extracting unit 8b and the timing regenerating unit 9b to perform processing by using the notified information. Accordingly, the baseband component extracting unit 8b and the timing regenerating unit 9b change their respective setting corresponding to the received information and perform demodulation processing corresponding to the bit rate of 2 kbps. Subsequently, the control unit 14 obtains reliability information $R_b$ from the timing regenerating unit 9b at a time $t_2$ shown in FIG. 14. Moreover, the control unit 14 notifies the values of the sampling period M, the number of steps N, and the period N' corresponding to the bit rate of 4 kbps to the baseband component extracting unit 8b and the timing regenerating unit 9b, and instructs the baseband component extracting unit 8b and the timing regenerating unit 9b to perform processing by using the notified information. After the baseband component extracting unit 8b and the timing regenerating unit 9b perform demodulation processing corresponding to the bit rate of 4 kbps, the control unit 14 obtains reliability information $R_c$ from the timing regenerating unit 9b at a time $t_3$ shown in FIG. 14.

Thus, the control unit 14 instructs the baseband component extracting unit 8b and the timing regenerating unit 9b to perform demodulation processing corresponding to all available bit rates and separately obtains reliability information $R_n$ (in this example, the reliability information $R_a$, $R_b$, and $R_c$) corresponding to each available bit rate. Subsequently, the control unit 14 detects the reliability information $R_n$ of maximum value. Meanwhile, the processing mode in which the control unit 14 obtains the reliability information $R_a$, $R_b$, and $R_n$ and detects the reliability information $R_n$ of maximum value is hereinafter referred to as a search mode. Thus, in the search mode, the control unit 14 sequentially notifies the values of the sampling period M, the number of steps N, and the period N' to the baseband component extracting unit 8b and the timing regenerating unit 9b. Then, the control unit 14 compares the reliability information $R_n$ of maximum value with a threshold value $TH_n$ and prolongs the search mode until the reliability information $R_n$ of maximum value exceeds the threshold value $TH_n$. During that period, the baseband component extracting unit 8b and the timing regenerating unit 9b maintain the setting corresponding to the received information (sampling period M, number of steps N, period N'). Thus, unless new information is received from the control unit 14, the setting of the baseband component extracting unit 8b and the timing regenerating unit 9b remains the same.

Once the reliability information $R_n$ of maximum value exceeds the threshold value $TH_n$, the control unit 14 keeps notifying the values of the sampling period M, the number of steps N, and the period N' corresponding to the reliability information $R_n$ of maximum value to the baseband component extracting unit 8b and the timing regenerating unit 9b. The reliability information $R_n$ of maximum value is the value when the baseband component extracting unit 8b and the timing regenerating unit 9b operate corresponding to the bit rate actually used for transmission. Thus, the baseband component extracting unit 8b and the timing regenerating unit 9b keep performing processing with the use of the received information from the control unit 14. The processing mode in which the control unit 14 keeps notifying the information corresponding to the reliability information $R_n$ of maximum value to the baseband component extracting unit 8b and the timing regenerating unit 9b is hereinafter referred to as a stable mode.

Thus, in the stable mode, the baseband component extracting unit 8b and the timing regenerating unit 9b keep receiving the same information from the control unit 14. However, because, as described above, the baseband component extracting unit 8b and the timing regenerating unit 9b maintain the same setting unless new information is received, the control unit 14 need not keep sending the same information as long as the reliability information $R_n$ is exceeding the threshold value $TH_n$. When the reliability information $R_n$ falls below the threshold value $TH_n$, the control unit 14 switches to the search mode and controls the operations of reliability information detection.

In this way, according to the third embodiment, the reliability information $R_n$ corresponding to each available bit rate is sequential detected in the search mode. On the other hand, in the stable mode, the baseband component extracting unit 8b and the timing regenerating unit 9b are set corresponding to the reliability information $R_n$ of maximum value. As a result, despite the fact that more time is consumed in obtaining all the reliability information $R_a$ $R_b$ and $R_c$ as compared to the second embodiment, there is no need to arrange the baseband component extracting unit, the timing regenerating unit, the data latching unit, and the automatic gain control unit in plurality corresponding to the number of available bit rates. Thus, as compared to the receiving apparatus according to the second embodiment, a circuit of smaller size can be implemented to configure the receiving apparatus for demodulating a signal transmitted at an unknown bit rate.

To sum up, according to the third embodiment, a receiving apparatus can be configured that, in an asynchronous system in which bit data cycles and spread code periods are not in a relation of integral multiples, performs demodulation without much energy loss (i.e., without much decline in bit error rate performance). In addition, even when a plurality of bit rates are available for transmission and the bit rate actually used for transmission is not known, the receiving apparatus can be configured to detect the bit rate used for transmission and performs correct demodulation while minimizing the increase in the circuit size.

Given below is the description according to a fourth embodiment of the present invention. In the above description according to the second and third embodiments, the reliability information $R_n$ is calculated by using the maximum value MxV, which is the maximum value from among the values stored in the cyclic addition performing unit 92, and the average value AvV, which is the average value of the values stored in the cyclic addition performing unit 92. Thus, that operation is equivalent to obtaining autocorrelation between a data series raised to the second power in the electric power converting unit 91 and a data series obtained by one-symbol delaying the abovementioned data series. However, alternatively, it is also possible to obtain the reliability information $R_n$ by using cross-correlation. For example, the output of a baseband component extracting unit that is set with the values of the sampling period M, the number of steps N, and the period N' corresponding to each bit rate is subjected to nonlinear processing (e.g. raising to the second power) and a cross-correlation value is calculated for the data series after nonlinear processing and a frequency component corresponding to each bit rate (symbol rate). The cross-correlation value can be used as reliability information.

If complex output data of a baseband component extracting unit is assumed to be $D_i$ (i being a sampling number, i=0, 1, 2, ...) and sampling speeds of all bit rates (symbol rates) are assumed to be $f_{s1}$, $f_{s2}$, and $f_{s3}$, then cross-correlation values $C_1$, $C_2$, and $C_3$ in Y sampling time can be obtained as given below.

$$C_1 = \sum_{k=i}^{i+Y} |D_i|^2 e^{j2\pi f_{S1} k}$$

$$C_2 = \sum_{k=i}^{i+Y} |D_i|^2 e^{j2\pi f_{S2} k}$$

$$C_3 = \sum_{k=i}^{i+Y} |D_i|^2 e^{j2\pi f_{S3} k} \qquad (8)$$

The reliable information $R_a$, $R_b$, and $R_c$ can be obtained by using correlation electric powers as given below.

$$R_a = C_1^2$$
$$R_b = C_2^2$$
$$R_c = C_3^2 \qquad (9)$$

Meanwhile, the position information MxP can be obtained by using the information of a vector angle θ indicated by a maximum value $C_{max}$ ($C_{max}$=Max ($C_1$, $C_2$, $C_3$)) that is the maximum value from the cross-correlation values $C_1$, $C_2$, and $C_3$ (vector angle θ=$\tan^{-1}$ {(Imaginary $C_{max}$)/(Real $C_{max}$)}).

Moreover, the maximum value MxV can be obtained by using the information of reliability information $R_{max}$ ($R_{max}$=Max($R_a$, $R_b$, $R_c$)) that is the reliability information of maximum value from among the reliability information $R_a$, $R_b$, and $R_c$. The automatic gain control unit 11 can then correct the amplitude by using the obtained maximum value MxV.

In this way, according to the fourth embodiment, cross-correlation information is used instead of the autocorrelation information used in the second and third embodiments. More particularly, the reliability information that is used in identifying the actual bit rate is obtained based on the cross-correlation information. As a result, in an asynchronous system in which bit data cycles and spread code periods are not in a relation of integral multiples, the receiving apparatus performs demodulation without much energy loss (i.e., without much decline in bit error rate performance). Moreover, even when a plurality of bit rates are available for transmission and the bit rate actually used for transmission is not known, the receiving apparatus detects the bit rate used for transmission and performs correct demodulation without much energy loss. Furthermore, it is also possible to improve the accuracy of timing regeneration, automatic gain control, and bit rate detection because the cross-correlation information is calculated based on the received signal and a signal with no noise, as opposed to the autocorrelation information that is calculated based on the received signal with noise in the transmission path.

Given below is the description according to a fifth embodiment of the present invention. As described above, in the timing regenerating unit (see FIG. 10) in the receiving apparatus according to the second and third embodiments, the electric power converting unit 91 converts the baseband signal component into an electric power and inputs the electric power to the cyclic addition performing unit 92. In comparison, according to the fifth embodiment, the baseband signal component is not converted into an electric power. Instead, a difference is calculated that indicates the difference between the baseband signal component not converted into an electric power and the baseband signal component of the previous bit and the difference is input to the cyclic addition performing unit 92. That is done to further improve the accuracy of bit rate determination performed by the determining unit 12 (in the second embodiment) or the control unit 14 (in the third embodiment). Moreover, instead of calculating the reliability information $R_n$ by using the maximum value MxV, which is the maximum value from among the values stored in the cyclic addition performing unit 92, and the average value AvV, which is the average value of the values stored in the cyclic addition performing unit 92 as described in the second and third embodiment, the maximum value MxV is used as likelihood information in the fifth embodiment and the reliability information $R_n$ is calculated from the average value AvV and a square value MxV2 that is the square value of the maximum value MxV.

In satellite-based communication, when no data (significant data) is being received by a satellite, sometimes a ground-based station constantly transmits the all-0 pattern to the satellite. If the receiving apparatus according to the second and third embodiment constantly receives the all-0 pattern, the same value is constantly input to the cyclic addition performing unit 92 of the timing regenerating unit. Thus, there is a possibility that an identical value corresponding to the oblivion coefficient α gets stored in all of the registers in the cyclic addition performing unit 92. When the receiving apparatus starts receiving significant data, the cyclic addition performing unit 92 performs IIR cyclic addition processing when all of the registers are storing an identical value. In that case, it is likely that more time is consumed until a difference occurs between the maximum value MxV and the average value AvV, which are calculated by using the values stored in the cyclic addition performing unit 92.

To avoid such a problem, according to the fifth embodiment, a difference of difference between the baseband signal component not converted into an electric power and the baseband signal component of the previous bit is input to the cyclic addition performing unit 92. Consequently, during reception of the all-0 pattern, "0" gets stored in all of the registers in the cyclic addition performing unit 92. Thus, when the receiving apparatus starts reception of significant data, the cyclic addition performing unit 92 can perform IIR cyclic addition processing when all of the registers are storing "0". In this way, at the time of starting to receive significant data after constantly receiving the all-0 pattern, the difference in the maximum value MxV and the average value AvV occurs in a shorter time period as compared to the case of using the electric power. That enables to perform accurate bit rate determination in a shorter time period.

Figure 15:
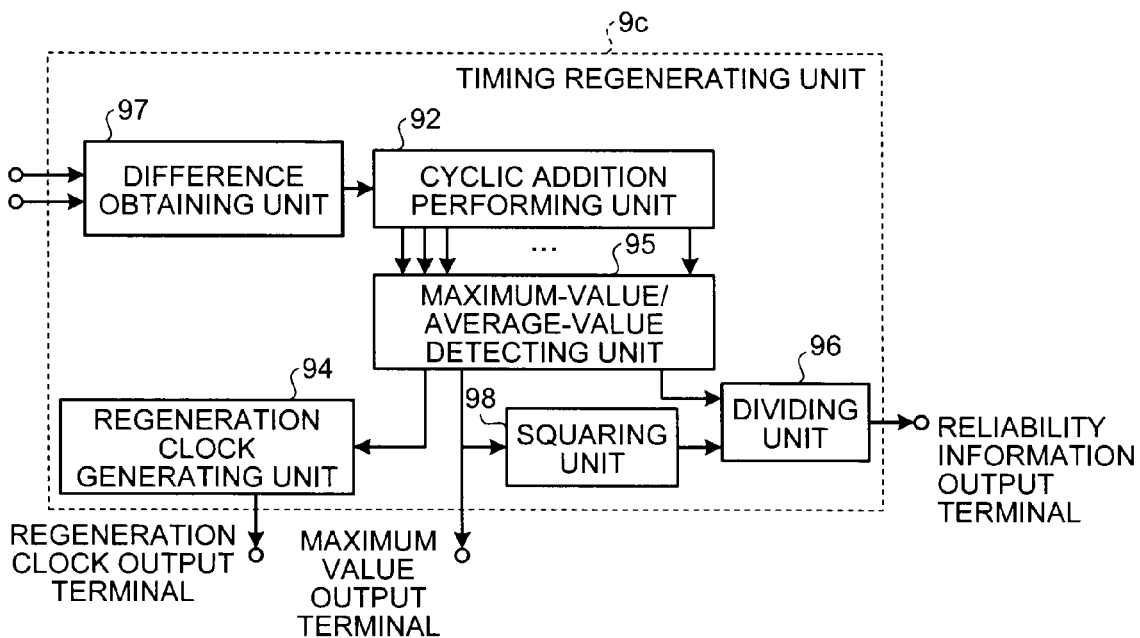
FIG. 15 is a schematic diagram of a configuration example of a timing regenerating unit according to a fifth embodiment of the present invention.

As described in the second and third embodiments, the reliability information $R_n$ is calculated from the maximum value MxV and the average value AvV. In comparison, according to the fifth embodiment, the reliability information $R_n$ is calculated from the square value MxV2, which is the square value of the maximum value MxV, and the average value AvV. That is because the maximum value MxV is used as likelihood information by which it becomes possible to improve the accuracy of bit rate determination. FIG. 15 is a schematic diagram of a configuration example of a timing regenerating unit 9c arranged in the receiving apparatus according to the fifth embodiment. The timing regenerating unit 9c has a similar configuration to that of the timing regenerating units 9a-1, 9a-2, and 9a-3 (see FIG. 10), except that a difference obtaining unit 97 is arranged instead of the electric power converting unit 91 and a squaring unit 98 is additionally included to calculate the square value of the maximum value MxV. The remaining constituent elements in FIG. 15 that are identical to those in the timing regenerating units 9a-1, 9a-2, and 9a-3 according to the second embodiment are referred to by the same reference numerals and their description is not repeated. Meanwhile, each of the timing regenerating units 9a-1, 9a-2, and 9a-3 according to the second embodiment and the timing regenerating unit 9b according to the third embodiment can be replaced by the timing regenerating unit 9c according to the fifth embodiment.

Figure 16:
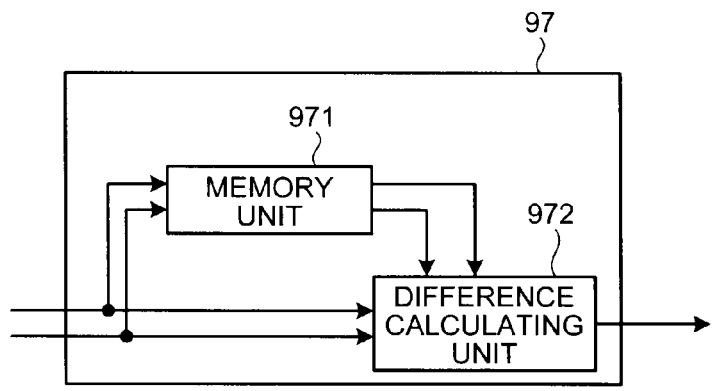
FIG. 16 is a schematic diagram of a configuration example of a difference obtaining unit shown in FIG. 15.

FIG. 16 is a schematic diagram of a configuration example of the difference obtaining unit 97. As shown in FIG. 16, the difference obtaining unit 97 includes a memory unit 971 and a difference calculating unit 972. The memory unit 971 and the difference calculating unit 972 receive baseband signal components as the input. The memory unit 971 is used to store the baseband signal component for a single bit (N symbol). The difference calculating unit 972 calculates, when a baseband signal component is input from a baseband component extracting unit, the difference between the baseband signal component and a baseband signal component of the previous bit stored in the memory unit 971. If it is assumed that, at time t, the I-channel signal is x[t] and the Q-channel signal is y[t], and the I-channel signal of the previous bit is x[t−N] and the Q-channel signal of the previous bit is y[t−N], then output z[t] calculated by the difference calculating unit 972 can be expressed as below.

$$z[t]=(x[t]-x[t-N])^2+(y[t]-y[t-N])^2 \qquad (10)$$

Meanwhile, the output z[t] can also be obtained as given below.

$$z[t]=\sqrt{(x[t]-x[t-N])^2+(y[t]-y[t-N])^2} \qquad (11)$$

$$z[t]=|x[t]-x[t-N]|+|y[t]-y[t-N]| \qquad (12)$$

The output z[t] calculated by the difference calculating unit 972 is sent to the cyclic addition performing unit 92 as input data.

The cyclic addition performing unit 92 performs IIR cyclic addition on the input data. The maximum-value/average-value detecting unit 95 calculates the maximum value MxV and the average value AvV. Those operations are identical to the operations described according to the second and third embodiments.

Subsequently, the squaring unit 98 calculates square value MxV2 that is the square value of the maximum value MxV. The dividing unit 96 divides the square value MxV2 by the average value AvV to obtain the reliability information $R_n$. Thus, in the above operations, the maximum value MxV is used as likelihood information and the ratio of the maximum value MxV and the average value AvV (MxV/AvV) that is used as the reliability information $R_n$ in the second and third embodiments gets weighted.

However, if there is a restriction on the circuit size, it is possible to omit the squaring unit 98 and obtain the reliability information $R_n$ as the ratio of the maximum value MxV and the average value AvV. In that case, the electric power converting unit 91 arranged in the timing regenerating unit (see FIG. 10) according to the second and third embodiments can be replaced by the difference obtaining unit 97.

Meanwhile, it is also possible to additionally include the squaring unit 98 in each of the timing regenerating units 9a-1, 9a-2, and 9a-3 according to the second embodiment and in the timing regenerating unit 9b according to the third embodiment. In that case, the reliability information $R_n$ is obtained as the ratio of the average value AvV and the square value of the maximum value MxV.

Moreover, the difference obtaining unit 97 can also be arranged in place of the electric power converting unit 91 in the timing regenerating unit 9 according to the first embodiment.

In this way, according to the fifth embodiment, bit rate determination is performed by using not an electric power but a difference that indicates the difference between the received baseband signal component and the baseband signal component of the previous bit. As a result, at the time of starting to receive significant data after constantly receiving the all-0 pattern, the average value AvV, which is used in calculating the reliability information $R_n$ required in bit rate determination, can be obtained in a shorter time period as compared to the case of using the electric power. That enables to perform accurate bit rate determination in a shorter time period.

To sum up, according to an aspect of the present invention, even in a communication system in which bit data cycles and spread code periods are not in synchronization, it is possible to accurately detect a bit period (i.e., to latch a baseband signal component at suitable timings) and perform demodulation without much decline in bit error rate performance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A timing regenerating device that regenerates a process timing for demodulating a reception signal in a spread spectrum communication system, the timing regenerating device comprising:
    a signal extracting unit that extracts a baseband signal from the reception signal on which an inverse spread processing is performed; and
    a reference clock generating unit that converts the baseband signal into an electric power and generates a reference clock for a latch timing of the baseband signal output from the signal extracting unit based on the electric power, wherein
    the reference clock generating unit includes
        an electric power converting unit that converts the baseband signal into the electric power,
        a cyclic adding unit that includes a plurality of information holding units, adds a value obtained by multiplying an oldest piece of information out of pieces of information held by the information holding units by an oblivion coefficient to the electric power, and replaces the oldest piece of information with a result of addition,
        an information detecting unit that, for every predetermined period, detects a maximum value from among the pieces of information held in the information holding units and rank order information indicating a rank order at which the maximum value is obtained as the result of addition, and
        a clock generating unit that generates the reference clock based on the rank order information.

2. The timing regenerating device according to claim 1, wherein the signal extracting unit includes
    an integrating unit that integrates the reception signal over M sampling intervals and divides a result of integration by M for every period M, where M is a positive integer, and
    a moving average processing unit that performs an averaging operation on latest N signals output from the integrating unit, where N is a positive integer.

3. The timing regenerating device according to claim 2, wherein M and N are determined based on a circuit size and a number of samplings per bit period of transmission data.

4. The timing regenerating device according to claim 1, wherein the predetermined period is a bit period of transmission data.

* * * * *